Figure 1:
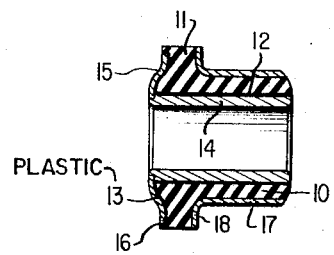

Feb. 14, 1967   A. J. MÜLLER   3,304,136
ELASTIC BEARING STRUCTURE
Filed Dec. 21, 1962   2 Sheets-Sheet 1

INVENTOR.
ALF JOHN MÜLLER
BY Dicke & Craig
ATTORNEYS.

Feb. 14, 1967     A. J. MÜLLER     3,304,136
ELASTIC BEARING STRUCTURE
Filed Dec. 21, 1962     2 Sheets-Sheet 2
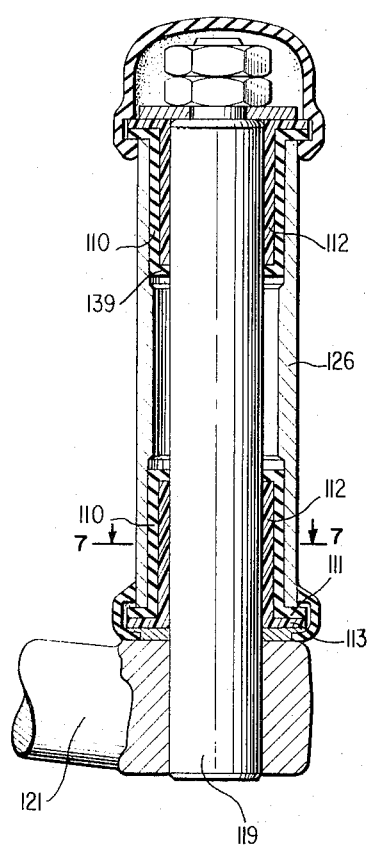
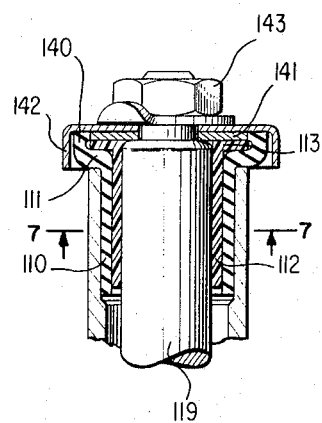
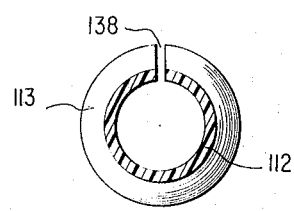
INVENTOR.
ALF JOHN MÜLLER
BY Dicke & Craig
ATTORNEYS

United States Patent Office 3,304,136
Patented Feb. 14, 1967

3,304,136
ELASTIC BEARING STRUCTURE
Alf John Müller, Stuttgart-Bad Cannstatt, Germany, assignor to Daimler-Benz Aktiengesellschaft, Stuttgart-Unterturkheim, Germany
Filed Dec. 21, 1962, Ser. No. 246,429
Claims priority, application Germany, Dec. 23, 1961,
D 37,769; Oct. 5, 1962, D 39,983
3 Claims. (Cl. 308—36.1)

The present invention relates to an elastic bearing structure, and more particularly to a rubber bearing for joints, especially for the guide members of vehicle wheel suspensions, provided with a rubber bushing and a bushing of synthetic material such as plastic or synthetic resinous material or other similar material having a relatively low frictional characteristic, to be referred to hereinafter as "synthetic material bushing," which covers or lines the rubber bushing and serves as bearing surface therefor.

It is known in the prior art to suspend guide or thrust members of wheels or also of swinging half-axles of motor vehicles in rubber joints or to connect the same with the vehicle parts relatively movable with respect thereto by means of rubber joints. These rubber joints are constructed in the usual manner as so-called metal-rubber bushings or sleeves in which a rubber bushing or rubber sleeve is connected with an internal and an external metal sleeve by vulcanization or also by simple press fit.

These prior art rubber sleeves, however, entail the disadvantage that they are strongly loaded or stressed in shearing in the circumferential direction of the sleeve during the movements of the guide members, that is, in particular during spring movements or deflections of the wheels. Furthermore, these prior art constructions produce an additional spring effect or spring action which is undesirable in particular when the wheel guided by means of the guide member is spring-supported against the vehicle superstructure by means of a frictionless spring, for example, by means of a coil spring devoid of guiding properties. The frictionlessness of the spring system is, under certain circumstances, strongly impaired in this case by the effect of the rubber bushing or buffer since the rubber bushing or buffer exerts a more or less strong damping effect and thereby prevents that the spring system responds to small shocks and vibrations.

The present invention aims above all at an elimination of these disadvantages in a relatively simple manner, and essentially consists in that a rubber bushing of the rubber bearing is lined at least at one of the gliding surfaces thereof with a sliding layer having relatively poor frictional characteristics, especially with a synthetic material layer or is connected thereat with a bushing of a material having relatively poor frictional characteristics, especially with a synthetic resin bushing. By reason of the inserted relatively frictionless sliding layer, that is, the layer having a poor frictional characteristic, the rubber bearing may yield within the joint practically instantaneously during the occurrence of rotary movements without loading or stressing the rubber cushion or buffer in shear in the circumferential direction since, by the reason of the very slight coefficient of friction of the synthetic material, the "break-out moment" or "initial break-away torque" of the bearing is very small. A return moment of the rubber bearing in the sense of a stiffening of the spring is consequently avoided. The wheels thereby roll off relatively softly and in a shock-free manner on permanent road surfaces in that the spring system responds instantaneously even to the smallest shocks. Moreover, such a rubber bearing requires no lubrication and exhibits a longer life length than a normal rubber bearing as the torsional loading or stressing is obviated.

The layer of plastic material of the rubber bushing may be provided at one cylinder surface, preferably at the internal surface of the rubber bushing. In one preferred embodiment of the present invention which is particularly of importance if the rubber bearing also is loaded in the axial direction, the rubber bushing is also provided at one axial end face thereof with a layer of synthetic material or any other suitable sliding layer of a material having poor frictional characteristics.

The connection of the layer having poor frictional characteristics with the rubber may take place by vulcanizing or any other suitable manner such as bonding, glueing, cementing or the like. The rubber bushing may be rigidly connected with a metallic part, for example, by vulcanization at the cylinder surface radially opposite the layer of synthetic material, especialy at the radially outer cylinder surface thereof. Possibly the rubber bearing may, however, be inserted also directly without separate metallic bushings into the one of the two mutually movable parts.

If the bushing made of plastic or synthetic resinous material covers or lines the rubber bushing in the form of an annularly closed bushing, that is, in the form of an endless bushing, on the side of the bearing surface, in which case the sliding movement takes place between the synthetic material bushing and the metallic bearing part forming a counter-bearing part, then such bearing construction normally possesses a bearing play between the synthetic material bushing and the metal bushing of, for instance, approximately 0.05 millimeter necessary for the proper operation of the bearing which play normally has no unfavorable or disadvantageous effects on the operation of the bearing. However, in special cases, especially with bearings subjected to alternating loads as have to be absorbed, for example, with a steering lever bearing of motor vehicle wheel suspensions, such bearing play leads to rattle noises.

This latter disadvantage is avoided by the present invention in constructing the synthetic material bushing in a springy or elastic manner so that the synthetic material bushing abuts in a play-free manner against the counter-bearing surface that may be, in particular, a metallic counter-bearing surface.

In order to attain this springiness or elasticity, the synthetic material bushing may be slotted over the entire length thereof. As a result thereof, it is possible to attain the synthetic material bushing to abut with pre-stress or pre-loading against the counter-bearing surface, for example, of a shaft or metallic bushing. The pre-stressing may thereby be produced by the synthetic material bushing itself, preferably however, by the fact that the synthetic material bushing is pressed into abutment radially against the counter-bearing surface by the already existing pre-stress of the rubber bushing.

By the present invention, all tolerances that may occur are compensated for by the pre-stressing of the synthetic material bushing and/or the rubber bushing; the same is also true with respect to any changes occurring during operation as a result of wear, by swelling due to the absorption of moisture, by temperature influence or other influences and causes that may occur in operation. Furthermore, rattle noises are avoided in the joint. The bearing therefore requires no adjustment of the play but instead is self re-adjusting and therefore completely foolproof. As a result of the radial yieldingness of the slotted synthetic material bushing or otherwise elastic synthetic bushing, the rubber bushing may be pressed more easily into the outer support which considerably facilitates assembly. Furthermore, the wall thickness of the rubber bushing may be reduced, for example, to that of the synthetic material bushing and therewith the elasticity of the bearing may be kept relatively small which is desirable or necessary, for example, with steering lever bearings of a wheel suspension.

By changing the selected pre-stress in the rubber, it is additionally possible to change the friction moment of the bearing and therewith to achieve a desired friction damping. The bearing is completely service-free.

Accordingly, it is an object of the present invention to provide a yielding bearing for two mutually movable parts, especially in vehicle wheel suspensions which avoids, by simple means, the shortcomings encountered with the prior art constructions.

It is another object of the present invention to provide a rubber bearing for joints, especially for relatively movable parts of wheel suspensions in which the rubber bushing is relieved of strong shearing stresses during relative rotary movements of the parts.

Another object of the present invention resides in the provision of a rubber bearing or other suitable elastic bearing for joints, especially for the guide parts of motor-vehicle wheel suspensions in which any additional spring effect is substantially completely avoided as such additional spring effects are undesirable, in particular, with wheel suspensions utilizing a frictionless spring system.

Still a further object of the present invention resides in the provision of a rubber bearing for joints, especially for use in vehicle wheel suspensions in which the spring system, especially a substantially frictionless spring system may respond to relatively small shocks and vibrations by preventing any impairment of the desired spring characteristics as a result of the effect of the rubber cushion and its damping action.

Another object of the present invention resides in the provision of a rubber bearing for joints which eliminates the disadvantages described hereinabove in a simple and effective manner, that is relatively inexpensive in manufacture and assembly, yet permits relative rotary movements between the relatively movable parts of the joint without subjecting the rubber bearing to shearing stresses and without producing any return moment in the rubber bearing that might lead to a stiffening in the spring characteristics of the spring suspension.

A still further object of the present invention resides in the provision of a rubber bearing that does not require any lubrication and has a length of life longer than normal rubber bearings while at the same time, when used in connection with wheel suspensions, permits an instantaneous response of the spring system even with the very small shocks.

Still another object of the present invention resides in the provision of an elastic bearing for joints of the type described hereinabove which precludes any bearing play and therewith any rattling noises as a result of such play.

Still another object of the present invention resides in the provision of a synthetic material bushing which is springily or elastically constructed in such a manner that it abuts against the counter-bearing surface, without any play.

Another object of the present invention resides in the provision of a rubber bearing for joints in which all occurring tolerances as well as any changes occurring during operation as a result of wear, absorption of moisture, temperature influence or other operational influences are automatically compensated for by the pre-stressing of the synthetic material bushing and/or the rubber bushing so that the bearing requires no initial adjustment nor any subsequent readjustment to adjust for any play, but instead is completely self-adjusting and foolproof.

Still another object of the present invention resides in the provision of a rubber bearing for joints of the type described hereinabove which may be installed more readily than the rubber bearings of the prior art, while at the same time permitting a reduction in the elasticity thereof and an adjustment of the friction movement and therewith an attainment of a predetermined desired friction damping.

Figure 2:
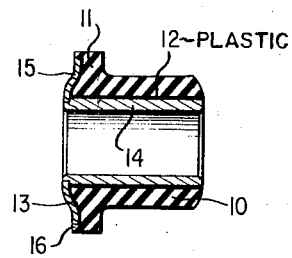
Figure 3:
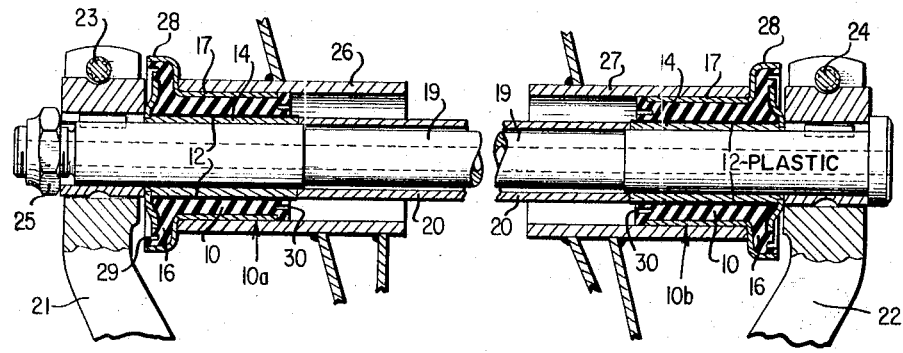
Figure 4:
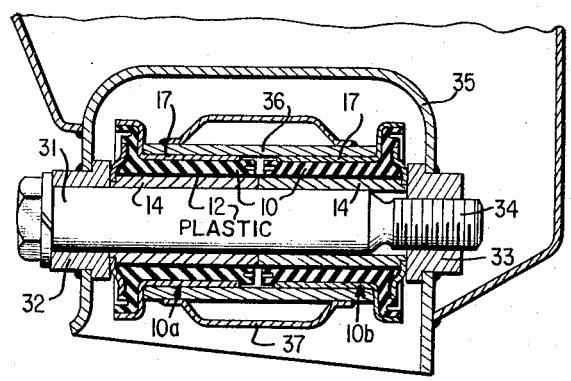

These and other objects, features and advantages of the present invention will become more obvious from the following description when taken in connection with the accompanying drawing which shows, for purposes of illustration only, several embodiments in accordance with the present invention, and wherein:

FIGURE 1 is a cross-sectional view through a first embodiment of a rubber bearing in accordance with the present invention provided with an external metallic sleeve, FIGURE 2 is a cross-sectional view, similar to FIGURE 1, of a modified embodiment of a rubber bearing in accordance with the present invention without an external metallic sleeve, FIGURE 3 is a partial cross-sectional view through a bearing arrangement for guide members provided with two rubber bearings in accordance with the present invention disposed at an axial distance from each other, FIGURE 4 is a partial cross-sectional view through a rubber bearing for a guide means provided with two rubber bearings disposed axially adjacent one another, FIGURE 5 is a partial longitudinal cross-sectional view through a further modified embodiment of a rubber bearing in accordance with the present invention, FIGURE 6 is a partial longitudinal cross-sectional view, similar to FIGURE 5, of still another modified embodiment of a rubber bearing in accordance with the present invention, and FIGURE 7 is a cross-sectional view through the synthetic material bushing alone, taken along line 7—7 of FIGURES 5 and 6.

Referring now to the drawing wherein like reference numerals are used throughout the various views to designate like parts, and more particularly to FIGURE 1, the rubber bearing illustrated therein consists of a rubber bushing 10 provided at one end thereof with a flange 11 which is provided radially inwardly thereof with an enlarged cross-sectional portion merging with the rubber bushing 10.

The rubber bushing 10 is provided on the inside thereof with a layer 12 of suitable synthetic plastic material, for example, of polyamide, Delrin, acetic resins or the like which is connected in any suitable manner with the rubber of the rubber bushing 10. A layer 13 made of the same synthetic plastic material is disposed also at the axially outer side of the flange 11. The rubber bushing 10 slides, by means of the synthetic material layer 12, on an inner metal sleeve 14 at the forward end of which is mounted, for example, by welding on an S-shaped bent metal disc 15 in such a manner that the rubber bushing 10 is axially supported against the metal sleeve 15 by means of the synthetic material layer 13. A sealing lip 16 further extends beyond the outer rim of the metal disc 15 which lip 16 projects in a flange-like manner in the axial direction from the rubber flange 11.

Furthermore, the rubber bushing 10 is armored on the outside thereof with a metal sleeve 17 which also abuts against the axially inner side of the rubber flange 11 with the flange 18 thereof and may be connected securely or adhesively with the rubber, for example, by vulcanization.

The embodiment of FIGURE 2 differs from that of FIGURE 1 essentially only in that the outer metallic sleeve 17 has been omitted.

The embodiment according to FIGURE 3 illustrates the installation of two metal-bearings approximately of the type illustrated in FIGURE 1 within a joint of a guide member for an independent wheel suspension. The two rubber bearings are thereby designated generally by reference numerals 10a and 10b. The inner sleeves 14 are placed or slipped over a cross shaft 19 and mutually support each other by means of a tubular spacing member 20. The sleeves 14 abut on the outside thereof against the guide arms 21 and 22 which, in turn, are connected at ends thereof, not shown in the drawing, for example, with a wheel carrier, a steering pin, or the like. The guide arms 21 and 22 are securely clamped onto the shaft 19 by means of screws or bolts 23 and 24 and are axially secured by means of a nut 25. The outer metal sleeves 17 externally surrounding the rubber bushing 10 are inserted into bearing eyes 26 and 27 of the vehicle superstructure, such as the vehicle frame or the vehicle body parts of a self-supporting type body construction.

In contrast to the construction according to FIGURE 1, the outer metal sleeves 17 of the embodiment of FIGURE 3 are provided with an axial outwardly directed additional collar 28 by means of which the rubber lips 16 are radially surrounded on the outside thereof. Furthermore, apertures or recesses 29 and 30 are provided in the rubber in order to facilitate the emplacement of the rubber or the slipping of the metal sleeve 17 over the rubber.

The embodiment according to FIGURE 4 shows two corresponding rubber bearings generally designated by reference numerals 10a and 10b which are arranged, directly axially adjacent one another, on the joint bolt 31 in that the two inner metal sleeves 14 directly support each other in the axial direction. The joint bolt 31 extends through the bearing 32 and is threadably secured in the bearing 33 by a threaded portion 34. The bearings 32 and 33 thereby form a part of the housing-like bearing cap 35 which may be rigidly secured, for example, by welding with the vehicle superstructure such as the frame or the vehicle body parts of a self-supporting type body construction.

The outer sleeves 17 of the rubber bearing are additionally inserted into a bearing eye 36 of a guide member 37 which serves also, for example, as suspension and guide arm of a wheel.

For example, FIGURE 3 may represent the bearing of an upper transverse guide member while FIGURE 4 the bearing for a lower transverse guide member of an independent quadrilateral steering guide system of a wheel. If the wheel carries out spring movements or spring deflections in the spring direction thereof, then the upper guide member 21, 22 moves while taking along the joint shaft 19 in that the inner metal sleeve 14 rotates within the synthetic material layer 12, however, practically without taking along the rubber 10 in the direction of rotation. The lower guide member 37 (FIGURE 4) in contrast thereto rotates together with the rubber bushing 10 and the synthetic material layer 12 on the inner metal sleeve 14 which in this case is rigidly secured with the vehicle superstructure.

Similar to FIGURES 1–4, in the embodiments of FIGURES 5 and 6, a steering guide member 121 is supported within a sleeve 126 which may be rigidly secured in any suitable manner (not illustrated) for example, with the vehicle superstructure, by means of a shaft or axle 119 within combined rubber-synthetic material bushings.

The combined rubber-synthetic material bushings of FIGURES 5 and 6 consist of the rubber bushings 110 and of the synthetic material bushings 112 inserted into the rubber bushings 110. The rubber and synthetic material bushings adhere to each other for example, exclusively by friction, however, without being connected to one another by bonding, glueing, cementing, vulcanization, or the like. The rubber bushings 110 and the synthetic material bushings 112 are each provided with a flange 111 and 113, respectively, by means of which they are also supported with respect to one another in the axial direction.

As illustrated in FIGURE 7, the synthetic material bushing 112 is slotted over the entire length thereof whereby the slot 138 has such a width that it permits the radial springiness of the synthetic material bushings necessary for the play-free abutment at the shaft 119 or a corresponding bearing element. As may be readily seen from the drawing, the rubber bushing 110 has only a wall thickness which corresponds approximately to the wall thickness of the synthetic material bushing 112 or is only slightly larger than the bushing 112. The rubber bushing 110 is pressed upon a synthetic material bushing 112 with pre-stress so that the bushing 112 by reduction of the gap 138 is pressed against the axle or shaft 119.

In the embodiment of FIGURE 5, an inwardly directed collar 139 of the rubber bushing 110 closes off the one axial end of the synthetic material bushing 112 with respect to the axle or shaft 119.

In the embodiment according to FIGURE 6, the rubber bushing 110 is provided with an S-shaped bent flange 140 by means of which it surrounds the flange 113 of the synthetic material bushing 112 and abuts against a support washer 141 or a cap 142 which axially closes the combined rubber synthetic material bearing and is threadably secured by a nut 143 on the axle or shaft 119.

It is obvious from the foregoing description that the elastic bearing in accordance with the present invention is completely service-free.

Additionally, the bearing in accordance with the present invention entails the advantages of a lacking re-adjusting moment, of noise- and vibration-damping, of a longer life-length by reason of elimination or torsional loads, as well as simplification and reduction in cost compared to the constructions of elastic joints known heretofore.

Since the friction between the rubber and the synthetic material is always greater than between a synthetic material and metal, a special adhesive connection between the synthetic material bushing and the rubber bushing is not necessary in the present invention. The synthetic material bushing and the rubber bushing, therefore, only require to be placed one into the other. This measure is also of advantage with a non-elastic, non-slotted synthetic material bushing according to FIGURES 1–4 and also applicable thereto.

While I have shown and described several embodiments in accordance with the present invention, it is understood that the same is not limited thereto, but is susceptible of numerous changes and modifications as known to a person skilled in the art. In particular, in lieu of or—appropriately—additionally to the joints at the vehicle superstructure side, the joints near the wheels may also be provided with corresponding rubber bearings in accordance with the present invention. The present invention is also applicable to other joints of wheel suspensions or other relatively movable vehicle parts. Additionally, the present invention is not limited in its use to wheel suspensions, but may also be applied in other areas in which two mutually movable parts are connected by joints.

Thus, it is obvious that the present invention is not limited to the particular embodiments illustrated herein, but is susceptible of numerous changes and modifications without departing from the spirit and scope thereof, and I therefore do not wish to be limited to the details shown and described herein, but intend to cover all such changes and modifications as are encompassed by the scope of the appended claims.

I claim:

1. A rubber bearing for joints, especially for the guide members of wheel suspensions, comprising:
   rubber bushing means provided with sliding surface means and including flange means having axially projecting sealing lip means,
   metal flange means for axially supporting said rubber bushing means,
   said sliding surface means comprising relatively frictionless synthetic material and being at least at one of said sliding surface means of said bushing means and at said flange means and effectively forming thereat a sliding layer having a low coefficient of friction, said sealing lip means at least partially surrounding said synthetic material layer and said metal flange means.

2. A rubber bearing for joints, especially for the guide members of wheel suspensions, comprising:
rubber bushing means provided with sliding surface means and including flange means having axially projecting sealing lip means,
metal flange means for axially supporting said rubber bushing means,
said sliding surface means comprising relatively frictionless synthetic material and being at least at one of said sliding surface means of said bushing means and at said flange means and effectively forming thereat a sliding layer having a low coefficient of friction,
said sealing lip means at least partially surrounding said synthetic material layer and said metal flange means,
and aperture means in the end surfaces of said rubber bushing means formed by one of the parts thereof consisting of its flange means and its sealing lip means.

3. A rubber bearing for joints, especially for the guide members of wheel suspensions, comprising:
rubber bushing means provided with sliding surface means and including flange means having axially projecting sealing lip means,
metal flange means for axially supporting said rubber bushing means,
said sliding surface means comprising relatively frictionless synthetic material and being at least at one of said sliding surface means of said bushing means and at said flange means and effectively forming thereat a sliding layer having a low coefficient of friction,
said sealing lip means at least partially surrounding said synthetic material layer and said metal flange means,
and aperture means in the end surfaces of said rubber bushing means formed by one of the parts thereof consisting of its flange means and its sealing lip means,
and said synthetic material sleeve means being constructed in a springy manner by the provision of a longitudinal slot extending over the entire axial length thereof so as to abut substantially without play at a counter bearing part of the bearing.

References Cited by the Examiner

UNITED STATES PATENTS

| | | | |
|---|---|---|---|
| 2,642,318 | 6/1953 | Ricks | 308—26 |
| 2,778,664 | 1/1957 | Herbenar | 308—238 X |
| 2,809,130 | 10/1957 | Rappaport. | |
| 2,827,303 | 3/1958 | Herbenar. | |
| 2,851,314 | 9/1958 | Thomson | 308—26 |
| 2,906,552 | 9/1959 | White | 308—238 X |
| 3,008,779 | 11/1961 | Spriggs | 308—238 |
| 3,009,746 | 11/1961 | Haushalter | 308—26 |
| 3,010,733 | 11/1961 | Melton | 308—238 X |
| 3,033,623 | 5/1962 | Thomson | 308—238 |
| 3,039,831 | 6/1962 | Thomas | 308—26 |
| 3,096,128 | 7/1963 | Wight | 308—238 X |
| 3,097,060 | 7/1963 | Sullivan | 308—238 X |
| 3,107,946 | 10/1963 | Drake | 308—184 X |

FOREIGN PATENTS

| | | |
|---|---|---|
| 805,538 | 12/1958 | Great Britain. |
| 821,954 | 10/1959 | Great Britain. |

MARTIN P. SCHWADRON, *Primary Examiner.*

ROBERT C. RIORDON, DAVID J. WILLIAMOWSKY, *Examiners.*

F. C. HAND, F. SUSKO, *Assistant Examiners.*